INVENTOR.
KENNETH R. LEWIS

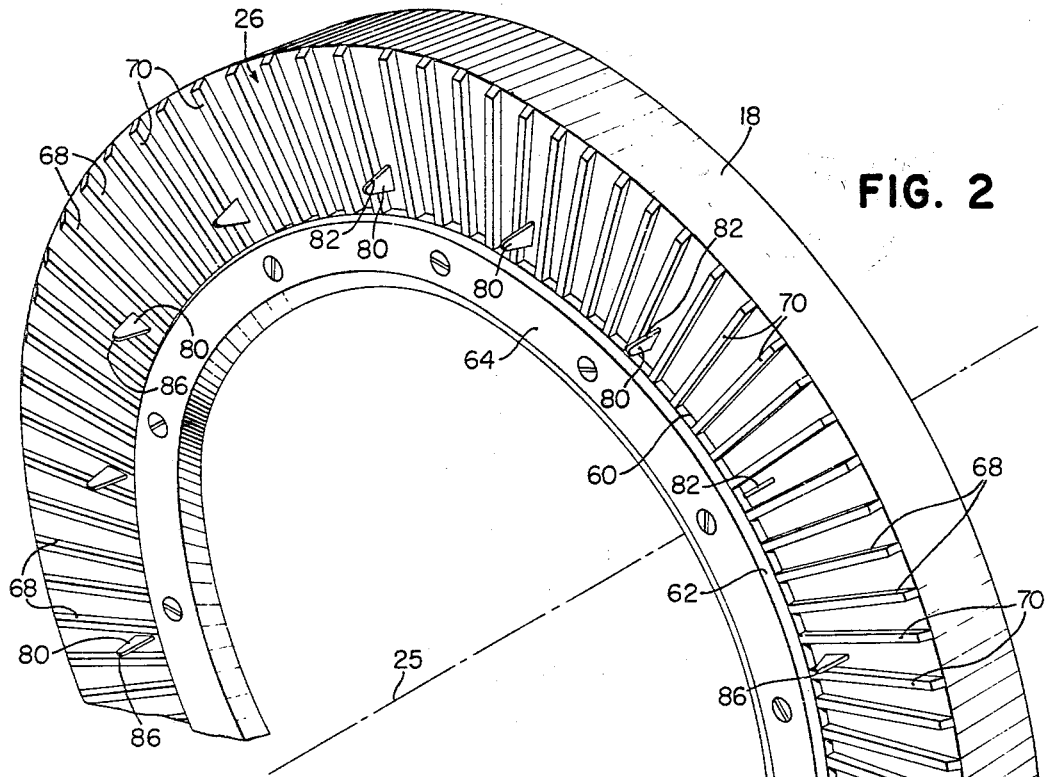
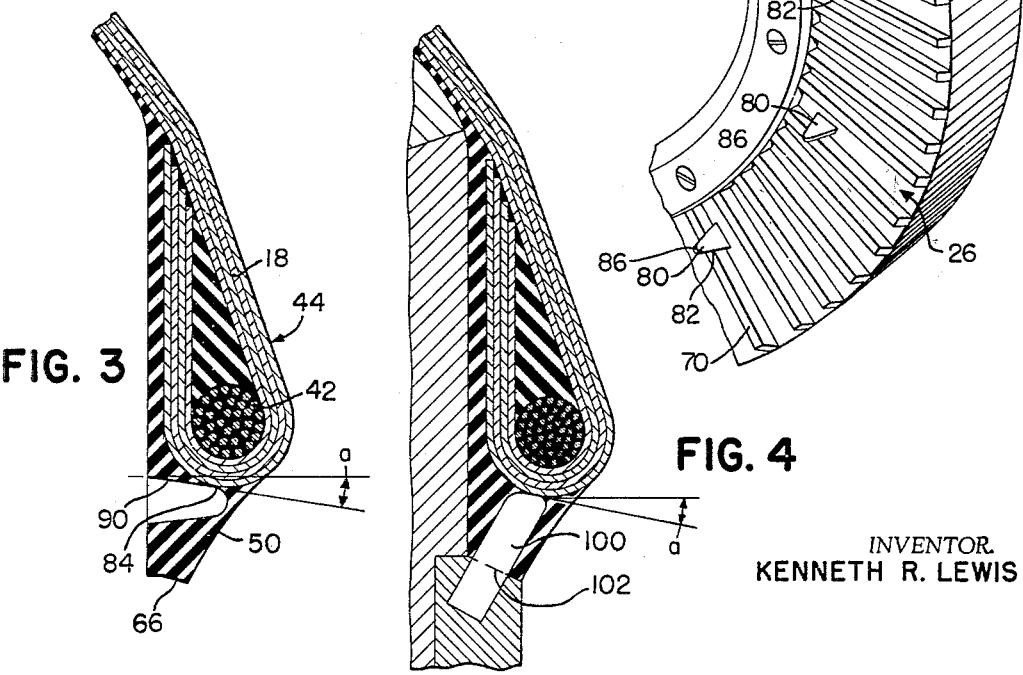

3,486,198
TIRE MOLD BEAD CENTERING DEVICE
Kenneth R. Lewis, Akron, Ohio; Donald A. Lewis, guardian of said Kenneth R. Lewis, incompetent; assignor to The Goodyear Tire & Rubber Company, Akron, Ohio, a corporation of Ohio
Filed July 13, 1967, Ser. No. 658,301
(Filed under Rule 47(b) and 35 U.S.C. 118)
Int. Cl. B29h 5/02
U.S. Cl. 18—42                                   8 Claims

ABSTRACT OF THE DISCLOSURE

A tire mold, particularly for molding an inner tire of a two-chambered vehicle tire, is provided with direct and independent bead locating means in the form of a set of bead engaging projections or blades mounted on each sidewall of the mold cavity. The blades of each set are equally spaced on a circle concentric with the mold central axis at a radius such as to engage firmly the internal surface of the bead of a tire to be cured in the mold. The mold is furnished with mating upper and lower halves, each provided with a separable sidewall molding ring and includes also a circularly continuous terminus or seat on each of the sidewalls, radially inward from the blades, to which the innermost edge or surface of the tire is extended.

The foregoing abstract is not to be taken as limiting the invention of this application, and in order to understand the full nature and extent of the technical disclosure of this application, reference must be made to the accompanying drawings and the following detailed description.

---

The present invention relates to tire curing molds and particularly to a tire mold for an inner tire of the type used within a road surface contacting or outer tire to protect the vehicle and its occupants or lading from injury in the event of loss of inflation pressure from the outer tire.

In a pneumatic tire the bead core or grommet ideally must be concentric with the tire axis and truly circular to provide circumferential uniformity as well as good rotational balance of the tire. The grommet must also be concentric with the sole of the bead, i.e., the radially inward surface or margin of the tire bead portion which engages the wheel rim surface upon which the tire is mounted. In a conventional road surface contacting tire of the present time, the bead sole is spaced from the bead core or grommet by a relatively thin cover layer of rubber and by one or more plies or layers of fabric. The fabric is tightly turned around the grommet to form the familiar stiff and hard inextensible bead. Heretofore, tire molds generally have been provided with a continuous circular pilot or seat at the radially inward edge of the sidewall molding surface, which seat extends into the mold cavity from the sidewall surface to engage, to locate, and to mold the sole of the bead of the tire. Thus the bead core and the body or carcass of the tire associated with the bead core are located or positioned in the tire mold by the engagement of the sole of the bead portion with the continuous circular pilot or seat which also serves to mold the bead sole surface. Although forces acting on the tire body during molding may be, and often are, not perfectly uniform, movement of the bead in the mold relative to the pilot or seat in response to such forces does not significantly displace the bead grommet from its desired concentricity with the tire or the mold. This is believed to result from the fact that the cover layer of rubber lying between the bead and the continuous circular seat of the mold is sufficiently thin to resist plastic movement of the rubber so that the circular seat itself provides the necessary concentricity of the beads in the mold. Moreover, the bead sole of the conventional road engaging tire, or outer tire, engages a wheel rim upon which it is mounted in firm circumferentially continuous mating relation.

Inner tires with which this invention is concerned, on the contrary, are provided with a lip or extension of rubber, extending radially inwardly from the bead, which is much thicker than, and differs in shape and axial thickness from the usual cover layer at the bead sole of the conventional outer tire. Depending upon the application for the inner tire, the extension may taper to a thin edge of negligible axial width at its radially innermost terminus, as for passenger car and light duty applications; or the extension may be provided with a radially innermost surface of appreciable axial width which is engageable with a wheel rim closely adjacent to the innerwall of the bead portion of the outer tire in which it is mounted, as for trucks and heavy duty service. In both of the described arrangements of inner tires, a layer of rubber considerably thicker, in the radial direction, than the previously described cover layer extends radially inwardly from the bead so that the radially innermost surface is spaced from the bead of an inner tire by a very substantial distance, for example, about ⅜ inch. This large amount of yieldable material extending radially inwardly from the bead to the radially innermost surface has precluded positively locating the bead by means of a circularly continuous mold seat as in the case of a more conventional tire. Where the lip terminates in a fine or narrow edge as described, the inward extension or lip is provided by the extrusion or flow of uncured rubber from the bead grommet or core and from the coated fabric surrounding the core to form the bead. This uncured rubber is moved in the mold radially inward from around and within the bead under the influence of the pressure between the mold surface and the mold bladder or bag.

On the other hand, the inner tire for truck, or heavy duty service, as has been mentioned, is provided, previous to its placement into a mold, with a lip or extension of appreciable mass radially inwardly from the bead and which, when molded and cured, has a radially innermost surface of appreciable width, the molding of which requires that the tire mold be provided with a continuous circular seat. Contrary to the experience described with more conventional outer tires, however, the large amount of yieldable material between the bead and the mold seat for forming or molding the innermost surface of the lip permits even the relatively minor non-uniformities in the forces acting in the mold on the tire body, and particularly on the lip or extension, to displace the bead relative to the mold axis; and, in any event, does not permit sufficiently positive locating of the bead by the mold seat as does the seat in the case of the more conventional tire. It is therefore the principal object of the present invention to provide a tire mold having novel and improved means for directly and accurately locating a tire bead in the mold, the locating means being separate and independent of any pilot or seat for forming the radially innermost surface of the tire.

The foregoing object, and other objects and advantages of the instant invention which will be pointed out or will become apparent hereinafter, are achieved by means of certain presently preferred embodiments herein disclosed and described with reference to the accompanying drawings, in which:

FIGURE 2 is a fragmentary perspective view, enlarged, of a sidewall ring of the mold of FIGURE 1.

FIGURE 3 is a partial sectional view of the bead region of an inner tire produced from the mold of FIGURE 1, and FIGURE 4 is a partial sectional view of an alternative form of tire mold embodying the instant invention.

Figure 1:
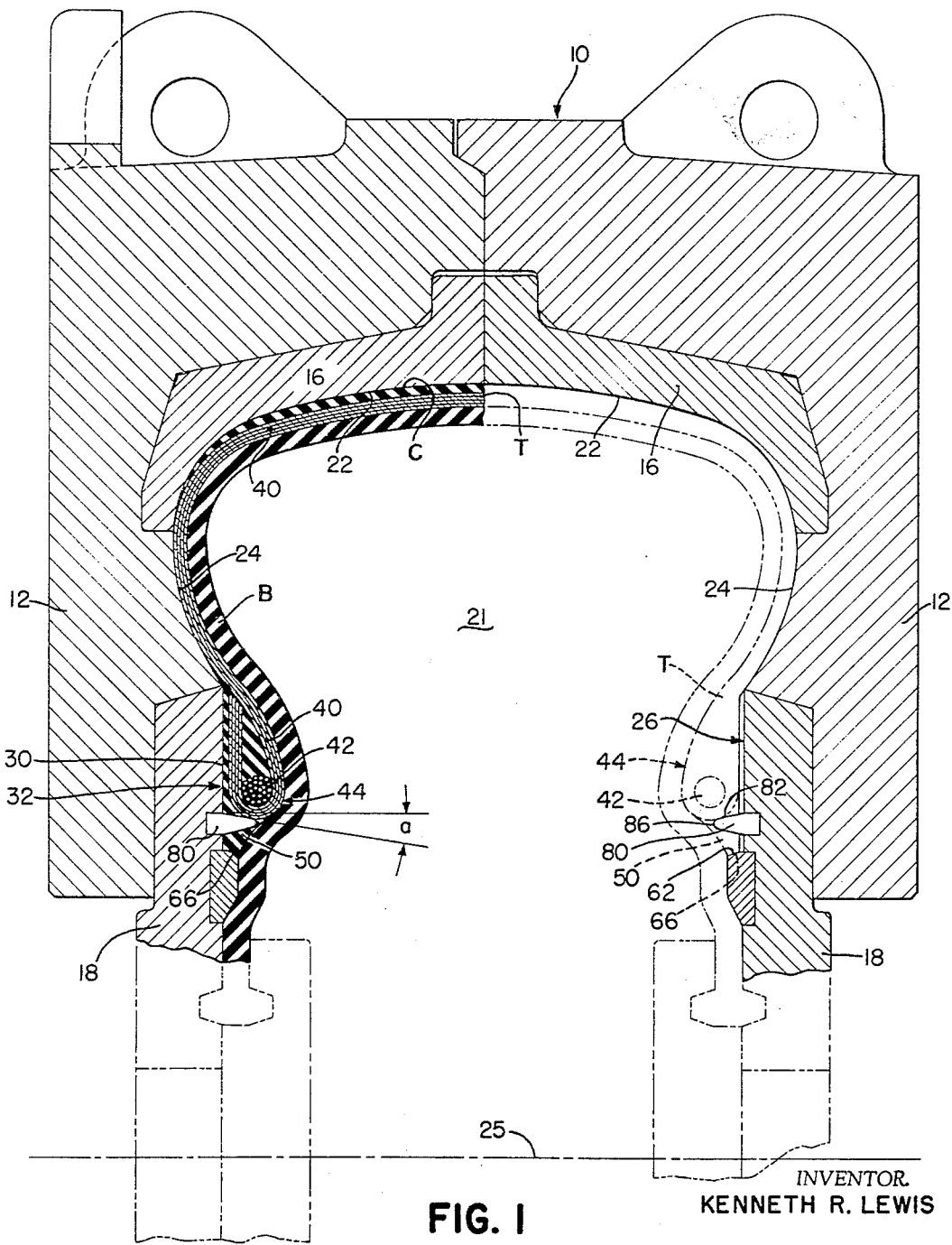
FIGURE 1 is a fragmentary cross-sectional view of a tire mold embodying the present invention.

As is shown in the drawings and particularly in FIGURE 1, a tire mold 10 of the type with which this invention is concerned comprises a pair of mold halves 12. Each mold half includes a tread ring 16 and a sidewall molding ring 18. An annular tire receiving cavity 21 is defined by the inner surfaces 22 of the tread rings, the inner surfaces 24 of the mold halves, and the faces 26 of the sidewall rings 18, the cavity 21 being concentric with the mold axis 25. The surfaces 22 of the tread rings 16 or 24 of the mold halves 12 can be provided with a pattern of protuberances and indentations whereby a conjugate pattern is produced on a tread portion of a tire placed within the mold cavity; or the surfaces 22, 24 can be smooth, as is shown, to produce a smooth circumferentially continuous crown area C on the tire T. Each sidewall ring 18 is located in and becomes a part of the respective mold half 12 so as to provide an annular sidewall molding face 26 against which the outer sidewall 30 of the bead region 32 of the tire T received in the mold 10 is formed.

The tire T is shown in FIGURE 1 is an inner tire for a two-chambered pneumatic tire used, for example, on trucks. The tire T is of generally conventional construction in that it has a carcass 40 formed of a plurality of layers or plies of cord fabric tightly wrapped around bead cores 42 to form the beads 44 of the tire T and extending between the beads. As is conventional, each bead core 42 comprises a plurality of turns of wire embedded in rubber and is circular and substantially inextensible. The term bead as used herein and in the appended claims will be understood to mean the relatively stiff, hard, and inextensible bead portion of a tire including the bead core or grommet and, where provided, the carcass plies which are wrapped therearound. A tire of the type with which this invention is concerned is further provided with an annular lip or extension 50 disposed radially inwardly from and joined to the bead 44. The mold 10 is provided with a conventional tire shaping bladder B by which the uncured tire T is expanded to fill the mold cavity. The bladder B, in the usual manner, is expanded by being filled with steam, air, or other fluid under pressure. When the uncured tire T is first placed in the tire mold 10 the rubber thereof, particularly in the bead 44 and lip 50 portions, is relatively plastic and deformable. The action of the fluid pressure within the bladder B compels the rubber of the uncured tire to conform with the inner surfaces 22, 24, 26 of the mold cavity 21 and forces the material of the bead portion to move radially inward along the annular sidewall molding face and there to form a radially innermost edge or surface of the tire.

With reference now to FIGURE 2, the sidewall ring includes an annular sidewall molding face 26 which has at its radially inner terminus 60 a circularly continuous seat 62 in the form of a ring 64 inserted in the sidewall ring 18 so as to be concentric with the sidewall ring 18 and with the mold axis 25. The seat 62 extends generally axially from the sidewall molding face 26 and defines therewith an included angle of about 105 degrees. The width of the seat is predetermined to suit the width of the margin or innermost face 66 of the lip or extension, but in any case is less in width than the bead sole molding seat of a conventional tire mold of comparable size.

The sidewall ring 18 is further provided with a multiplicity of air passage forming ribs 68 extending radially across the annular face 26. The ribs stand outwardly from and parallel to the face 26 into the mold cavity 21, are spaced at generally equal angles about the mold axis 25 and, as is known, provide grooves (not shown) in the external surface 30 of the bead region 32 of the tire T for the purpose of permitting air to enter between the inner tire and an outer tire (not shown). It will also be apparent that the ribs 68 have surfaces 70 facing into the tire molding cavity 21 which serve to locate the bead 44 in its predetermined axial position, but that the rib surfaces 70 are inherently incapable of locating the bead 44 circumferentially, or concentrically, with respect to the axis 25 of the mold.

In accordance with the invention each mold half 12 is provided with tire bead centering means in the form of a plurality of generally axially extending projections 80 disposed in circular array concentric with the mold axis 25 and extending inwardly of the mold cavity 21 from adjacent the sidewall molding face 26. As is shown in FIGURES 1 and 2, the projections 80 take the form of narrow blades each of which has a bead engaging surface 82, which surfaces are disposed in a circular array concentric with the mold axis 25. The surfaces 82 are disposed at a radial distance greater than the radial distance from the mold axis 25 to the inner terminus 60 of the sidewall molding face 26, which terminus is defined in the embodiment described by the continuous circular seat 62. The bead engaging surfaces 82 of the projections 80 are, as may be seen in FIGURE 1, inclined at a slope or angle $a$ from the sidewall mold face toward the axis. A slope, $a$, of about 15 degrees has been found to be satifactory. It will be apparent that this inclination $a$ is outward with respect to the mold axis 25 and toward the sidewall mold face 26 so that a substantially inextensible bead 44 of a tire T placed into the mold cavity 21 can be urged into concentricity with the mold axis 25 while the bead 44 is being moved into contact with the rib surfaces 70 of the mold face 26. Each of the blades or projections 80 is tapered outwardly from the molding face 26 so that the plastic material of the lip or extension 50 can flow to surround the blades.

As seen more clearly in FIGURE 2, each projection or blade 80 is located between a pair of the air passage forming ribs 68 and extends axially into the tire mold cavity 21 from the mold face 26 between the ribs 68 a distance which is significantly greater than the distance to which the ribs stand outwardly from the mold face. The projections 80, and particularly the bead engaging surfaces 82 thereof, extend axially a sufficient distance from the mold face to engage and support the bead 44, the length being such that the blade 80 projects from the rib surfaces 70 a distance approximately equal to one-half the axial thickness of the bead 44. The surfaces 82 engage the inwardly oriented surface 84 of the bead; however, it is within the scope of the present invention to dispose bead engaging surfaces of the projections 80 to engage the outwardly oriented surfaces of a bead. The axial length of the projections, however, is preferably not sufficient to permit them to come into scuffing contact with the bladder B of the tire mold 10 so as to cause premature wear or failure thereof. As will be seen in FIGURE 3, the projections 80 cause permanent indentations 90 in the tire material adjacent the bead. The action of the bladder B forces the projections 80 to penetrate the lip portion 50, or forces the material of the lip portion to envelope the projections. The bead engaging surfaces 82 of the projections 80 guide the bead 44 and the core or grommet 42 thereof to its location concentric with the mold axis 25. The plastic flow of the rubber material radially below or inword from the bead 44 is induced by the fluid pressure in the bladder B so that the lip 50 is extended radially inwardly to the mold face terminus 60 which is defined by the continuous circular seat 62. Thus, the radially innermost surface or edge 66 of the inner tire is formed, or reformed, to be concentric with the mold axis, the tire rotational axis, independently and separately from the concentricity therewith of the bead; nevertheless both the bead and the innermost edge of the inner tire are concentric with the mold axis, with the tire, and therefore with each other.

In the embodiment of the invention here described the blades 80 are relative narrow, being about $\frac{1}{16}$ inch in thickness, but are sufficiently thick to avoid cutting or otherwise damaging the cords or fabric, one or more plies of which are wrapped tightly around the grommet to form the bead 44. From 3 to 16 or more blades may be used, 16 being employed in the embodiment described, each of which blades is about ¼ inch in width as measured radially with respect to the sidewall ring. Sufficient stiffness radially is thus provided to securely locate the bead 44 concentrically with respect to the cavity 21 and and the mold axis despite any forces tending to displace the bead 44 during the placement of the tire T into the mold 10 or during the molding operation. While any convenient number of blades may be placed in the concentric array described and the width or thickness of each individual blade be more or less than mentioned herein, the dimensions and arrangements described have been found to be entirely suitable. The radius of the circular array of blades, which is to say the radial distance, from the axis 25, at which each bead engaging surface 82 is located, is determined to suit the diameter of the bead and of the bead core of the particular size tire for which the mold 10 is intended.

The outward tips 86 of the projections or blades 80 are smoothly rounded to effect their engagement with the fabric wrapping the bead core 42 smoothly without snagging or cutting the fabric. The rounding of the tips 86 and the slope and taper previously mentioned facilitate guiding of the bead 44 into concentricity with the mold and the mold axis 25 even though the uncured tire T may not be initially received in precise concentricity with the mold axis 25 or in symmetry with the upper and lower halves 12 of the mold.

In the embodiment shown the blades are seated tightly into recesses provided within the sidewall ring by electrolytic machining. Those skilled in this are will recognize that other means of attachment as well as alternative locations for the placement of the projections will prove fully satisfactory. For example, and referring now to FIGURE 4, the projections 100 can extend outward radially from the circularly continuous seat 102 instead of directly axially from the sidewall ring surface 26, as previously described.

It has been found that the indentations 90 in the lip or extension 50 extending radially inwardly from below the grommet 42 and bead 44 and which indentations remain in the cured tire do not interfere with the performance of the inner tire in service.

In a tire mold in accordance with the invention the bead of a tire is held firmly concentric with the mold axis by bead centering means throughout the operation of molding and curing the tire while at the same time the rubber, or rubber-like material, of the tire in its uncured and plastic state is enabled, by undergoing plastic flow, to extend radially inwardly of the mold to the terminus of the sidewall and there to form a concentric radially innermost edge or surface.

The invention provides for improved accuracy in the manufacture of tires and particularly of inner tires. Not only are the tire bead, and the grommet itself, accurately and positively located in the tire mold, but also, since minor non-uniformities in fabricating the tire prior to molding are corrected by the aforesaid plastic flow during molding, the edge or surface which may locate the inner tire, at least during the operation of mounting the inner and outer tire, with respect to the wheel, is made concentric with the bead. Moreover, the grommets or bead cores at the opposing sides of the tire have improved concentricity with each other.

While certain representative embodiments and details have been shown for the purpose of illustrating the invention, it will be apparent to those skilled in the art that various changes and modifications may be made therein without departing from the spirit or scope of the invention.

What is claimed:

1. In a tire mold having an annular tire receiving cavity disposed concentrically about a mold axis and including an annular sidewall molding face, tire bead centering means comprising a plurality of projections carried by said mold generally equally spaced angularly about said axis, said projections having bead engaging surfaces being adjacent said molding face and being disposed in circular array concentric with and at a radial distance from said axis significantly greater than the least radius of a tire within said cavity, whereby a bead of an uncured tire placed into said tire mold may be firmly located by said surfaces concentrically with said mold axis.

2. In a tire mold as claimed in claim 1 the improvement wherein each of said bead engaging surfaces inclines toward said axis.

3. In a tire mold as claimed in claim 1 the improvement wherein each of said bead engaging surfaces is disposed at a raidal distance greater than the radial distance from said axis to the inner terminus of said face, whereby said projections cause permanent indentations in tire material adjacent the bead of an uncured tire molded in said mold.

4. In a tire mold as claimed in claim 1 the improvement wherein said projections are narrow blades and each of said surfaces inclines outwardly with respect to said axis and toward said mold face so that a substantially inextensible bead of a tire placed into said cavity will be urged by said surfaces into concentricity with said axis while said bead is being moved into contact with said mold face.

5. In a tire mold as claimed in claim 1 including a circularly continuous tire margin molding seat disposed concentrically about said axis and extending inwardly into said cavity from said face at the radially inner terminus of said face, and wherein said projections comprise a plurality of narrow blades extending from adjacent said face into said cavity, each blade having a bead engaging surface disposed at a radial distance greater than the radial distance to said terminus from said axis, each said surface being inclined from said face toward said axis, each said blade being a second surface disposed at an acute angle to the first said surface in a plane containing said axis so that each said blade tapers outwardly from said molding face, whereby plastic tire material can flow to surround said blade.

6. In a tire mold as claimed in claim 1 including an annular sidewall molding ace having a multiplicity of air passage forming ribs extending radially across said face substantially parallel to and standing outwardly from said face, the improvement wherein said projections comprise narrow blades extending axially into said cavity from said face between said ribs a distance significantly greater than said ribs stand outwardly from said face.

7. In a tire mold as claimed in claim 1 the improvement wherein said mold is provided with a circularly continuous tire margin molding seat disposed concentrically about said axis and extending axially inwardly into said cavity from said face and said projections extend radially outwardly from said seat.

8. In a tire mold as claimed in claim 1 the improvement wherein said surfaces extend axially from said face.

(References on following page)

References Cited

UNITED STATES PATENTS

| | | |
|---|---|---|
| 696,124 | 3/1902 | Wheeler et al. |
| 1,283,778 | 11/1918 | Hulse. |
| 1,958,072 | 5/1934 | Sebrell _____ 18—38 X |
| 2,812,545 | 11/1957 | Soderquist. |
| 2,835,921 | 5/1958 | White. |
| 2,846,722 | 8/1958 | Soderquist. |
| 2,870,482 | 1/1959 | Eriksen. |
| 2,880,459 | 4/1959 | Weigold et al. |
| 2,978,741 | 4/1961 | Soderquist. |
| 3,170,187 | 2/1965 | Brundage. |
| 3,184,794 | 5/1965 | Sherkin. |
| 3,366,995 | 2/1968 | Dijken et al. |

J. HOWARD FLINT, Jr., Primary Examiner

U.S. Cl. X.R.

18—17, 38